U S 0 1 1 7 1 1 5 8 3 B 2

US011711583B2

(12) United States Patent
Sen et al.

(10) Patent No.: US 11,711,583 B2
(45) Date of Patent: *Jul. 25, 2023

(54) LEARNING ACTIVITY DURATION FOR PROVIDING CONTENT DURING ACTIVITY

(71) Applicant: ROVI GUIDES, INC., San Jose, CA (US)

(72) Inventors: Susanto Sen, Karnataka (IN); Charishma Chundi, Andhra Pradesh (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/677,075

(22) Filed: Feb. 22, 2022

(65) Prior Publication Data

US 2022/0256244 A1      Aug. 11, 2022

Related U.S. Application Data

(63) Continuation of application No. 17/126,100, filed on Dec. 18, 2020, now Pat. No. 11,290,782, which is a
(Continued)

(51) Int. Cl.
*H04N 21/466* (2011.01)
*H04N 21/414* (2011.01)
(Continued)

(52) U.S. Cl.
CPC ... *H04N 21/4667* (2013.01); *H04N 21/41407* (2013.01); *H04N 21/42203* (2013.01); *H04N 21/44222* (2013.01)

(58) Field of Classification Search
CPC ......... H04N 21/4667; H04N 21/41407; H04N 21/42203; H04N 21/44222; G06F 3/165; G06F 3/167
See application file for complete search history.

(56) References Cited

U.S. PATENT DOCUMENTS 11,290,782 B2 *  3/2022  Sen .................... H04N 21/4667
2009/0184823 A1   7/2009  Tessier
(Continued)

FOREIGN PATENT DOCUMENTS

EP          3441873 A1       2/2019

OTHER PUBLICATIONS

PCT International Search Report for International Application No. PCT/US2020/034880, dated Aug. 12, 2020 (14 pages).

*Primary Examiner* — John R Schnurr
(74) *Attorney, Agent, or Firm* — Haley Guiliano LLP

(57) ABSTRACT

Methods and systems are described for recognizing an activity and providing content for consumption during the activity. The methods and systems use an activity engine to learn a duration of an activity by receiving input with a start cue indicating a start of an activity and receiving input with a stop cue indicating an end of the activity. The activity engine determines an average or estimated duration for the activity based on the time difference between the start cue and the stop cue so that when the activity engine receives a third input and identifies the start cue, a content curation engine identifies one or more content items with a total runtime substantially similar to the average or estimated duration for the activity and provides the content for consumption.

20 Claims, 8 Drawing Sheets

Related U.S. Application Data continuation of application No. 16/424,992, filed on May 29, 2019, now Pat. No. 10,904,622.

(51) Int. Cl.
*H04N 21/422* (2011.01)
*H04N 21/442* (2011.01)

(56) References Cited

U.S. PATENT DOCUMENTS

| | | |
|---|---|---|
| 2013/0253833 A1 | 9/2013 | Tuukkanen |
| 2014/0122483 A1 | 5/2014 | Zhang et al. |
| 2015/0088423 A1 | 3/2015 | Tuukkanen |
| 2016/0007912 A1 | 1/2016 | Hu et al. |
| 2017/0161338 A1 | 6/2017 | Kurata et al. |
| 2018/0109920 A1 | 4/2018 | Aggarwal et al. |
| 2018/0188054 A1 | 7/2018 | Kennedy et al. |
| 2019/0107993 A1* | 4/2019 | Shibuya .................. G06F 3/16 |

* cited by examiner

| Entry ⌐401 | Begin Cue ⌐402 | End Cue ⌐404 | Duration ⌐406 | Updated Average ⌐408 |
|---|---|---|---|---|
| 1 | 3/5/2019 6:35:13 PM ⌐412 | 3/5/2019 7:12:39 PM ⌐414 | 0:37:26 ⌐416 | 0:37:26 ⌐418 |
| 2 | 3/6/2019 5:31:29 PM ⌐422 | 3/6/2019 6:11:17 PM ⌐424 | 0:39:48 ⌐426 | 0:38:37 ⌐428 |
| 3 | 3/7/2019 6:01:33 PM ⌐432 | 3/7/2019 6:37:45 PM ⌐434 | 0:36:12 ⌐436 | 0:37:49 ⌐438 |
| 4 | 3/8/2019 7:02:44 PM ⌐442 | 3/8/2019 7:41:51 PM ⌐444 | 0:39:07 ⌐446 | 0:38:08 ⌐448 |

LEARNING ACTIVITY DURATION FOR PROVIDING CONTENT DURING ACTIVITY

CROSS REFERENCE TO RELATED APPLICATIONS

This application is a continuation of U.S. patent application Ser. No. 17/126,100, filed Dec. 18, 2020, which is a continuation of U.S. patent application Ser. No. 16/424,992, filed May 29, 2019, now U.S. Pat. No. 10,904,622, the contents of which are incorporated by reference herein in their entireties.

BACKGROUND

The present disclosure relates to systems for providing content during an activity, and more particularly to systems and related processes for learning a variable-duration activity and providing content substantially contemporaneously to a variable-duration activity.

SUMMARY

Digital devices are designed to facilitate delivery of content to a user. Multitasking with digital devices is often encouraged with the utilization of advanced hardware with increased memory and fast processors in devices. These digital devices—e.g., computers, telephones, smartphones, tablets, smartwatches, microphones (e.g., with a virtual assistant), activity trackers, e-readers, voice-controlled devices, servers, televisions, digital content systems, video game consoles, and other internet-enabled appliances—are part of not only the digital world, as the devices can help simplify, expedite, or supplement real-world tasks, e.g., upon a user's voice, touch, or other input.

Tasks and activities that are conducive to multitasking with a device may allow content consumption throughout the duration of an activity. Content like video, animation, music, audiobooks, playlists, podcasts, images, slideshows, games, text, and other media may be consumed by users at any time, as well as nearly in any place and during almost any activity (for better or worse). It is not uncommon to use a device to watch videos, read an article, or look at photographs while participating in another separate activity.

A user may stream a portion of broadcast news during her breakfast. Another user may listen to part of a podcast during her morning commute. A user might watch last night's episode of his favorite fantasy TV show while riding an exercise bicycle. A family may sit down to dinner and enjoy watching a trivia-based game show on DVR. Content contemporaneously delivered and consumed, via a device, during an activity can entertain, educate, and enhance an activity, as well as save time.

A duration of an activity does not always match a runtime of content. A user's aerobic exercise is not complete whenever an episode happens to finish. The cut-off portion of a news program is not valueless because a breakfaster did not eat her daily orange on a particular day. Unfortunately, an evening bus ride home does not finish just because a true-crime podcast identifies the culprit.

Additionally, activities may not always take an identical, fixed length of time and may, in fact, have a variable duration. For example, fitting daily exercise into a busy schedule may cause the activity duration to fluctuate from day to day. Lunch may run longer one day versus another. A commuter train trip duration may vary based on weather. A user may watch segments of sports and/or business news during her 18-minute breakfast. Another user may listen to two or three podcasts during her 75-minute morning commute. A user might catch up on his favorite fantasy TV show and then watch funny pet videos while exercising on a treadmill for 50 minutes. A family may sit down to dinner and enjoy listening to 11 songs from their favorite four artists each night. Content contemporaneously delivered and consumed, via a device, during an activity can entertain and educate users, and enhance an activity, as well as save time, however, having to manually cue up content or create a media playlist to consume during a variable-duration activity may diminish any benefits. Identifying appropriate new, interesting, and/or unseen content to fill the time of the variable-duration activity no longer must be based on guesswork and does not have to be identified manually. An embodiment of the present invention can learn to recognize a variable-duration activity and provide content for consumption for the duration of that activity.

One alternative approach to providing content during an activity may constantly deliver content without ever knowing if or when a variable-duration activity ends. For instance, portions of radio or television broadcasts might be consumed during an activity where a user is apathetic about content substance or duration. A user may tune in to a portion of a 24/7 news network during breakfast or watch a syndicated rerun while working out on a rowing machine. Consuming this content may be more of a distraction from a variable-duration activity or merely observed out of habit. When a variable-duration activity ends the user might turn off the device, but such content may continue. While certain examples of such content may be valued highly by some, these may be considered unnecessary "background noise" to many others. Such content may also be delivered regardless of user preference and/or activity duration. Even narrow distinctions in content may make a difference to a user. For instance, a user might choose to listen to live sports talk radio discussing football during a drive to work when she might prefer to hear a podcast about her favorite soccer team if it were as convenient as tuning the radio. There are more potential benefits, such as higher entertainment value, more learning opportunities, and more efficient use of time when the content is highly valued or tailored to a user and activity duration. Content providers can benefit too from delivering content to receptive audiences more efficiently.

One alternative approach may require user input of a duration of a variable-duration activity and match a video runtime to that estimated duration. Such an approach requires the precise input of a time duration by a user and is oblivious to the nature of the activity and the history of activity durations.

One approach may identify a variable runtime video with a duration similar to a variable-duration activity and cut or extend the variable runtime video to fit within the duration. Such an approach may compel the user to watch an undesired or inappropriate video merely because the runtime matches the duration. Such an approach may provide content that annoys a user with additional commercials or may deprive a user of many scenes when a video is cut too much.

There exists a need for learning a variable-duration activity and its duration in order to identify one or more content items with a total runtime similar to the duration so content may be provided for consumption during the next occurrence of the activity. Moreover, there exists a need to continuously or regularly update a duration for a variable-duration activity so that one or more content items with a total runtime similar to an updated duration may be identified for subsequent performances of the variable-duration activity.

A system may be taught or able to learn a duration of a variable-duration activity by observing and recording the start and stop of a variable-duration activity and calculating an average or estimated duration for subsequent performances of the variable-duration activity.

The start and stop of a variable-duration activity may be signaled by a start cue and a stop cue, respectively. A cue may be identified as incorporated in or associated with an input. A cue may be explicit or implicit. For instance, an explicit start cue may be found in sound input with a user telling the system that the variable-duration activity is beginning. An explicit start cue may also be a found in touch input or visual/gesture input similarly signaling the start. An implicit start cue may be a found in sound input such as the sound of a cereal box pouring breakfast into a bowl. An implicit start cue for starting an exercise bike activity by the sound of the bicycle pedals or an initialization beep, or via visual input identifying a user is in position and/or started. Using swimming as an example activity, an implicit start cue could be detection of water. While an explicit stop cue may be a voice command to stop an activity timer, an implicit stop cue may be the absence of the sound from a treadmill or a camera or sensor measuring movement away from the stationary bicycle seat.

Once a duration of a variable-duration activity is learned, and the next performance of the activity can be estimated, content items can be identified and provided for consumption during the activity by, e.g., a content curation engine. The content items, such as video, animation, music, audiobooks, playlists, podcasts, images, slideshows, games, text, and other media, can be played back-to-back for multitask viewing while performing the variable-duration activity. Content may come from various sources including broadcast television and radio, cable, satellite, IPTV, over-the-top streaming services, video on demand, DVR, video sharing sites, social media, podcasts, blogs, live feeds, and other multimedia streams. Content typically has associated metadata or other information to identify whether a potential content consumer may be interested in the content. A content curation engine may be used to search for one or more programs that align with a user's interests. A user generally has preferences as to types, sources, substantive content, actors, producers, and other content descriptions that can be used to identify potential content items to provide during an activity if the content items fit in the expected activity duration. For instance, a user may be shown videos of a sports news recap and a segment of the weather report while exercising on a stationary bicycle, and the total runtime of the videos matches the duration of the exercising activity. Watching two videos, in this case totaling 37 minutes, may be beneficial to the user over watching the first part of one 44-minute episode of a cable drama television program (and later finding at least seven minutes to finish the program) especially if the user indicates a preference for sports and weather updates in a profile or other settings. A user may have preferences to consume certain content, e.g., particular television programs or segments of videos, during specific variable duration activities.

Shorter-duration content, such as video clips, may be becoming more readily available, as anyone with a phone can become a content creator. Audiences' attention spans may be getting shorter. It may be more beneficial to a user to play a dozen video clips—e.g., updates on news, sports, fashion, health, comedy, cooking, etc.—than to watch only a portion of a longer television program. It is not reasonable or efficient for a user to manually create a playlist with desired content prior to each performance of a variable-duration activity. Once a duration of a variable-duration activity is learned or can be accurately estimated, one or more content items with a total runtime similar to the learned duration can be provided.

Embodiments of the invention may still shorten or lengthen content but doing so is not always necessary. Variable runtime content items may be used in conjunction with other content items in order to better match a learned duration of a variable-duration activity so that portions are not, e.g., unnecessarily cut, or lengthened with additional advertisements. Additional content can be provided to reach an estimated average duration for a variable-duration activity. Rather than provide one long television program for incomplete consumption during an activity, providing a shorter a shorter television program followed by other videos or segments may be completed within a learned duration for a variable-duration activity.

There may always be situations where a user chooses a particular program or content for consumption during a specific time period or activity. There may always be situations where a user consumes undesired content merely out of convenience. By offering content personalized to a user, and tailored to a variable-duration activity and its expected duration, entertainment, education, and efficiency of time may increase.

Methods and systems disclosed herein may use an activity engine to learn a duration of an activity by receiving input with a start cue indicating a start of an activity and receiving input with a stop cue indicating an end of the activity. The activity engine determines an average or estimated duration for the activity based on the time difference between the start cue and the stop cue, so that when the activity engine receives a third input and identifies the start cue, a content curation engine may be used to identify one or more content items with a total runtime substantially similar to the average or estimated duration for the activity and provides the content for consumption.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 4 depicts an illustrative table for an activity duration data structure, in accordance with some embodiments of the disclosure;

DETAILED DESCRIPTION

Figure 1:
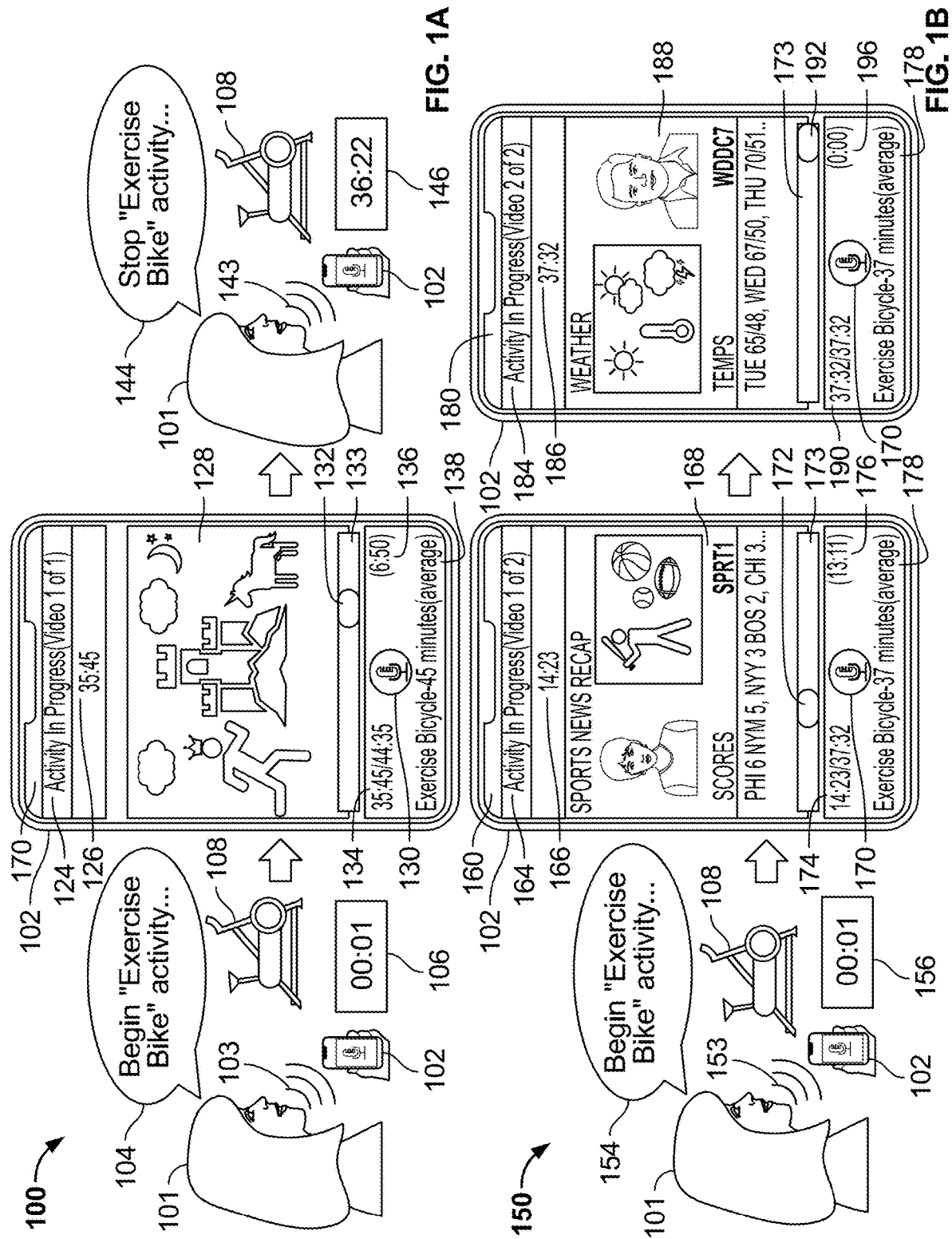
FIG. 1A depicts an illustrative scenario and user interface for learning a duration of a variable-duration activity and providing content, in accordance with some embodiments of the disclosure.
FIG. 1B depicts an illustrative scenario and user interface for providing content during a learned duration of a variable-duration activity, in accordance with some embodiments of the disclosure.

FIG. 1 depicts an illustrative scenario and user interface for learning a duration of a variable-duration activity and providing content during a variable-duration activity, in accordance with some embodiments of the disclosure.

Figure 7:
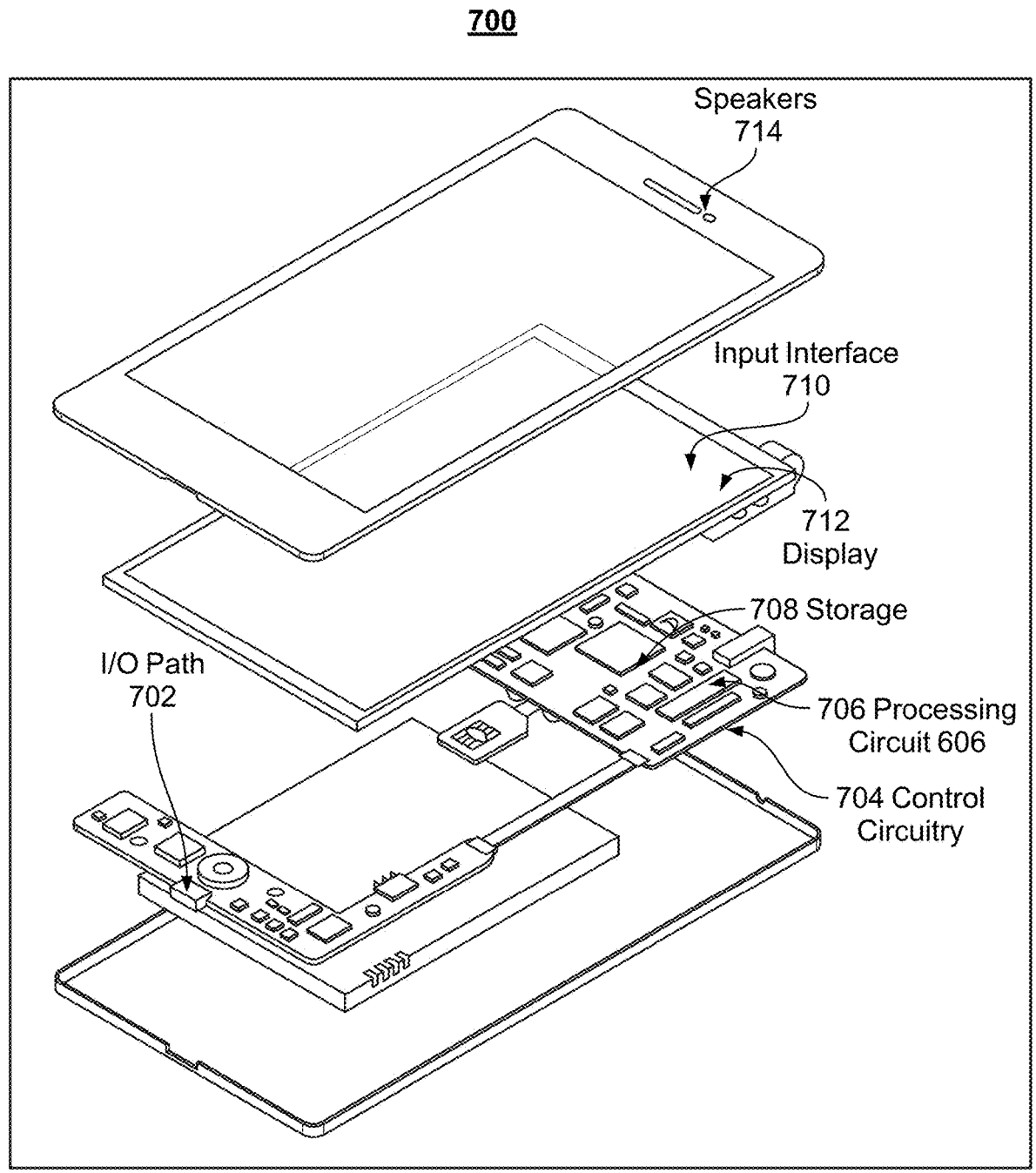
FIG. 7 is a diagram of an illustrative device, in accordance with some embodiments of the disclosure.
Figure 8:
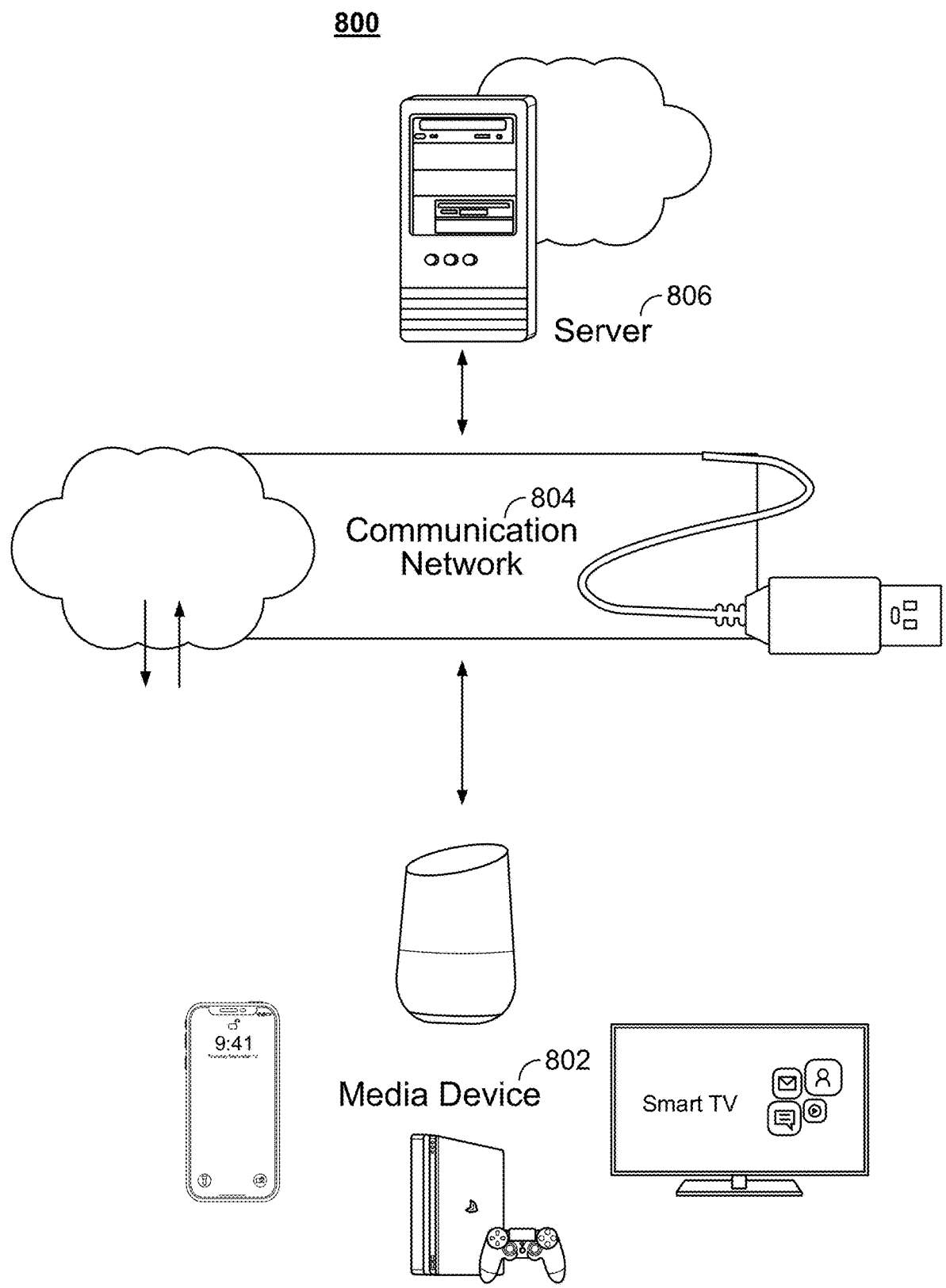
FIG. 8 is a diagram of an illustrative system, in accordance with some embodiments of the disclosure.

An exemplary embodiment is depicted in FIG. 1A as scenario 100 with smartphone 102. Smartphone 102 may be any other suitable device such as a personal computer, laptop, tablet, media center, video console, or any device as depicted in FIGS. 7 and 8, as long as the device has capabilities to receive input and provide content for consumption.

Exemplary scenario 100 of FIG. 1A depicts an embodiment that learns a duration of an activity 108 in order to subsequently provide content for the duration of activity 108, such as in scenario 150 of FIG. 1B. Scenario 100 depicts smartphone 102 receiving input 103 from user 101. In one or more embodiments, input 103 may be a voice command received by smartphone 102 from user 101. In an embodiment, input 103 may be a button press or a gesture by user 101 received by smartphone 102. In one or more embodiments, input 103 may include information identifying user 101. In exemplary scenario 100, input 103 comprises begin cue 104. In an embodiment, input 103 may not comprise begin cue 104 and input 103 may be associated with begin cue 104. For example, an input gesture may trigger begin cue 104. Upon smartphone 102 receiving input 103 comprising or associated with a begin cue 104, a begin timer 106 initiates. An embodiment may record a timestamp for the begin cue 104 and begin timer 106 may be a calculated real-time difference from the timestamp for begin cue 104. In an embodiment, begin cue 104 may identify activity 108, e.g., "Begin 'Exercise Bike' activity . . . " and begin cue 104 and activity 108 may be recorded.

Scenario 100 also features an exemplary display screen of smartphone 102 with a content delivery application depicted as user interface 120. User interface 120 may feature content, e.g., video 128, that may be displayed during activity 108. In scenario 100, where the system may be training or learning a duration, video 128 may be chosen in many different ways. For instance, an embodiment may select video 128 by default. In an embodiment, video 128 may be, e.g., a television program from VOD, DVR, or OTT. An embodiment may select video 128 based on matching a runtime to a similar predetermined average activity duration. An embodiment may select video 128 based on matching a runtime to an average activity duration retrieved from a database. An embodiment may use, e.g., an anonymized database of times from other users to estimate or predict an average activity duration or a default activity duration. An embodiment may select video 128 based on matching a runtime to a prior average activity duration and update an average activity duration via learning or training as depicted in scenario 100. An embodiment may estimate an initial or default activity duration based on the runtime of video 128 selected by, e.g., a user or a content provider.

On user interface 120 appears banner 124, which indicates that an activity is "in progress" and the displayed video is "1 of 1." Counter 126 is depicted showing a time 35:45 and progress time 134 indicates that the progress is 35:45 out of a runtime of 44:35. Remaining time 136 indicates that 6:50 remains in video 128. The position of marker 132 on video progress bar 133 also indicates a relative progress time and a remaining time of a video. An embodiment may use microphone icon 130 to indicate a potential for input, such as a voice command, that could, e.g., pause, resume, or end an activity. Activity identifier 138 may provide feedback that the system has identified activity 108 correctly and/or an estimated duration for activity 108. An embodiment may hide or move one or more features of user interface 120, such as counter 126, video progress bar 133, or others so as not to distract from video 128.

Scenario 100 further depicts smartphone 102 receiving input 143 from user 101. In an embodiment, input 143 may likewise be a voice command received by smartphone 102 from user 101. In an embodiment, input 143 may be a button press or a gesture by user 101 received by smartphone 102. In exemplary scenario 100, input 143 comprises stop cue 144. In an embodiment, input 103 may not comprise stop cue 144 and input 143 may be associated with stop cue 144, such as when input 143 is a button press or gesture. Upon smartphone 102 receiving input 143 comprising or associated with a stop cue 144, stop timer 146 is recorded as a duration. An embodiment may update an average activity duration. An embodiment may record a timestamp for stop cue 144, and stop timer 146 may be a calculated real-time duration from a timestamp for begin cue 104. In an embodiment, stop cue 144 may identify activity 108, e.g., "Stop 'Exercise Bike' activity . . . " and stop cue 104 and activity 108 may be recorded.

In scenario 100, video 128 has a runtime of 44:35, as depicted by progress time 134, but stop timer 146 indicates a duration of 36:22. Scenario 100 indicates an embodiment that may learn, update, or be trained for a new activity duration. An embodiment may update a new activity duration by calculating a new average activity duration for activity 108, using analysis such as an arithmetic mean, mode, median, weighted average, or other statistical calculations or algorithms.

Exemplary scenario 150 of FIG. 1B depicts an embodiment that has learned a duration of an activity 108, e.g., in scenario 100, and provides content for the duration of activity 108. Scenario 150 depicts an embodiment in which two videos are provided after learning or updating an average activity duration, such as in scenario 100.

Scenario 150 depicts smartphone 102 receiving input 153 from user 101. In an embodiment, input 153 may be a voice command received by smartphone 102 from user 101. In an embodiment, input 153 may be the same or similar to input 103. Upon smartphone 102 receiving input 153 comprising or associated with a begin cue 154, a begin timer 156 initiates. An embodiment may record a timestamp for the begin cue 154 and begin timer 156 may be a calculated real-time difference from the timestamp for begin cue 154. In an embodiment, begin cue 154 and activity 108 may be recorded.

Scenario 150 also features an exemplary display screen of smartphone 102 with a content delivery application depicted as user interface 160. User interface 160 may feature content, e.g., video 168, that may be displayed during activity 108. In scenario 150, where the system has been trained or has learned an activity duration, video 168 may be chosen in many different ways.

On user interface 160 appears banner 164, which indicates that an activity is "in progress" and the displayed video is "1 of 2." Counter 166 is depicted showing a time 14:23 and progress time 174 indicates that the progress is 14:23 out of a runtime of 37:32. Remaining time 176 indicates that 13:11 remains in the total runtime. The position of marker 172 on video progress bar 173 also indicates a relative progress time and a remaining time. An embodiment may use microphone icon 170 to indicate a potential for input such as a voice command. Activity identifier 178 may provide feedback that the system has identified activity 108 correctly and/or an average duration for activity 108. An embodiment may use in scenario 150 an update of a new activity duration from scenario 100. For instance, in scenario 150, activity identifier 178 depicts "37 minutes (average)" as a learned average activity duration for "Exercise Bicycle" as compared to activity identifier 138, in scenario 100, which depicts "45 minutes (average)" as a prior average activity duration for "Exercise Bicycle." An embodiment may hide or move one or more features of user interface 160, such as counter 166, video progress bar 173, or others so as not to distract from video 168.

Scenario 150 also features another exemplary display screen of smartphone 102 with a content delivery application depicted as user interface 180. User interface 180 may feature content, e.g., video 188, that may be displayed during activity 108 subsequently to a display of video 168 in user interface 160. In scenario 150, where the system has been trained or has learned an activity duration, video 188 may be chosen in many different ways.

On user interface 180 appears banner 184, which indicates that an activity is "in progress" and the displayed video is "2 of 2." Counter 186 is depicted showing a time 37:32 and progress time 190 indicates that the progress is 37:32 out of a runtime of 37:32. Remaining time 196 indicates that 00:00 remains in total runtime. The position of marker 192 on video progress bar 173 also indicates a relative progress time and a remaining time. An embodiment may hide or move one or more features of user interface 180, such as counter 186, video progress bar 173, or others so as not to distract from video 188. An embodiment may allow further input to receive, e.g., a stop cue similar to stop cue 144. An embodiment may use microphone icon 170 to indicate a potential for input such as a voice command.

An embodiment may select video 168 and video 188 in many ways. A difference between scenario 150 and scenario 100 may be that scenario 150 provides video 168 and video 188 with a runtime of 37:32 while scenario 150 provides video 128 with a runtime of 44:35. In an embodiment like scenario 100, video 128 may be a television program from VOD, DVR, or OTT originally produced for broadcast in an hour-long spot, however, because stop timer 146 of scenario 100 indicates a duration of 36:22, activity 108 finished prior to completion of video 128.

In scenario 150, video 168 and video 188 are selected as "Video 1 of 2" and "Video 2 of 2," as depicted in banner 164 and banner 184, respectively. In an embodiment like scenario 150, video 168 and video 188 may be selected in part because the total runtime of both videos, as indicated by progress time 174 and progress time 190, is similar to a learned average activity duration of "37 minutes (average)" as depicted in activity identifier 178. In an embodiment, video 168 and video 188 may be selected instead of a television program with a runtime similar to video 128 because the runtime exceeds an average activity duration for activity 108 by a predetermined threshold. In an embodiment, video 168 and video 188 may be selected based on substantive content in each of video 168 and video 188. In an embodiment, video 168 and video 188 may be selected from a pool of potential content items, for instance, because of associated metadata matching a profile of user 101 as well as fitting a runtime similar to a learned average activity duration.

Figure 2:
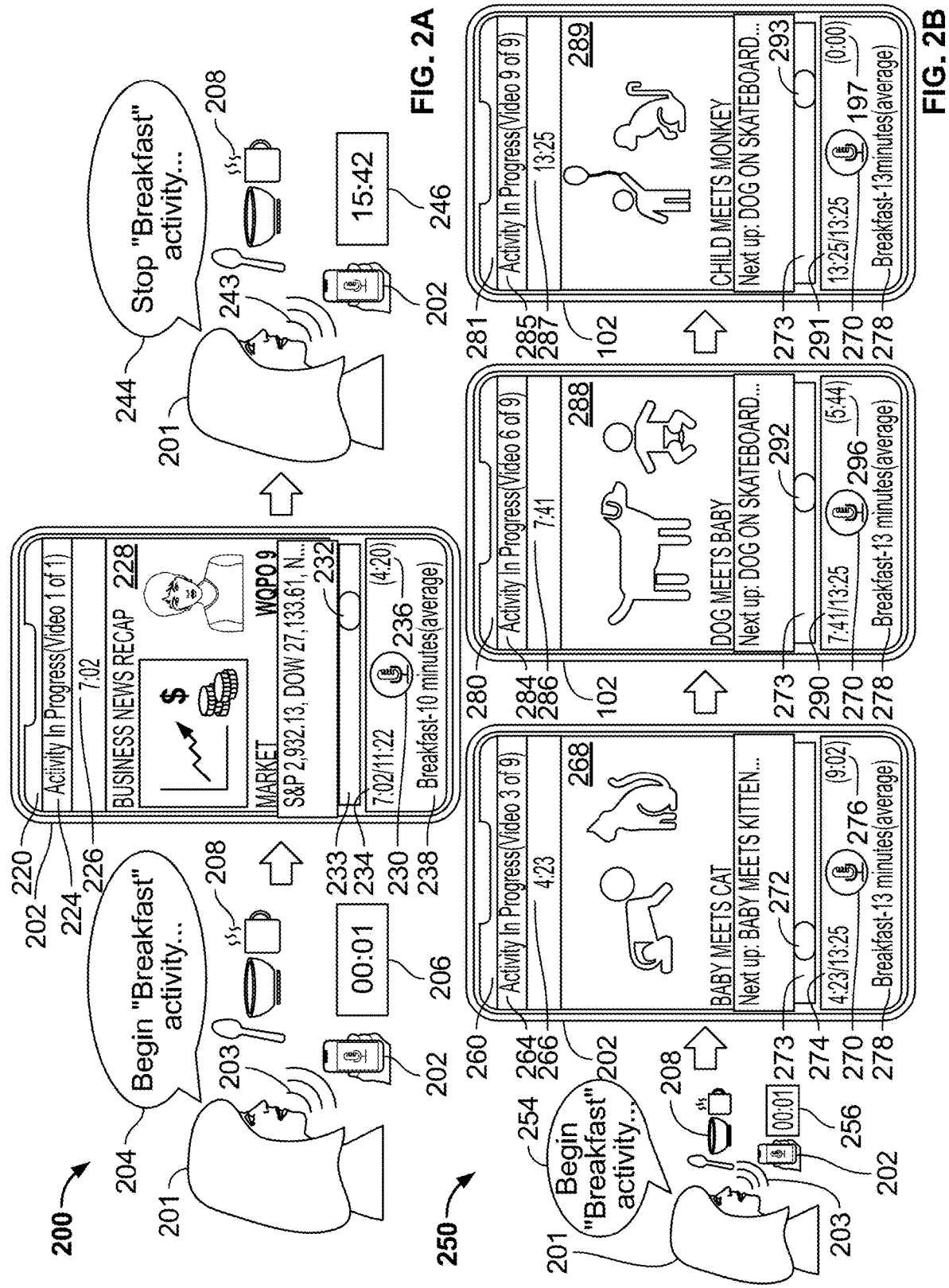
FIG. 2A depicts an illustrative scenario and user interface for learning a duration of a variable-duration activity and providing content, in accordance with some embodiments of the disclosure.
FIG. 2B depicts an illustrative scenario and user interface for providing content during a learned duration of a variable-duration activity, in accordance with some embodiments of the disclosure.

FIG. 2 depicts an illustrative scenario and user interface for learning a duration of a variable-duration activity and providing content during a variable-duration activity, in accordance with some embodiments of the disclosure.

An exemplary embodiment is depicted in FIG. 2A as scenario 200 with smartphone 202. Smartphone 202 may be any other suitable device such as any device as depicted in FIGS. 7 and 8.

Exemplary scenario 200 of FIG. 2A depicts an embodiment that learns a duration of an activity 208 in order to subsequently provide content for the duration of activity 208, such as in scenario 250 of FIG. 2B. Scenario 200 depicts smartphone 102 receiving input 203 from user 201. In an embodiment, input 203 may be any form of input, e.g., a voice command or a button press or a gesture, by user 201 and received by smartphone 202. In exemplary scenario 200, input 203 comprises, triggers, and/or is associated with begin cue 204. Upon smartphone 202 receiving input 203 and begin cue 204, a begin timer 206 initiates. An embodiment may record a timestamp for begin cue 204, and begin timer 206 may be a calculated real-time difference from the timestamp for begin cue 204. In an embodiment, begin cue 204 may identify activity 208, e.g., "Begin 'Breakfast' activity . . . " and begin cue 204 and activity 208 may be recorded in an activity duration database.

Scenario 200 also features an exemplary display screen of smartphone 202 with a content delivery application depicted as user interface 220. User interface 220 may feature content, e.g., video 228, that may be displayed during activity 208. In scenario 200, where the system may be training or learning a duration, video 228 may be chosen in many different ways. For instance, an embodiment may select video 228 based on matching a runtime to a similar predetermined average activity duration.

On user interface 220 appears banner 224, which indicates that an activity is "in progress" and the displayed video is "1 of 1." Counter 226 is depicted showing a time 7:02 and progress time 234 indicates that the progress is 7:02 out of a runtime of 11:22. Remaining time 236 indicates that 4:20 remains in video 228. The position of marker 232 on video progress bar 233 also indicates a relative progress time and a remaining time of a video. An embodiment may use microphone icon 230 to indicate a potential for input such as a voice command. Activity identifier 238 may provide feedback that the system has identified activity 208 correctly and/or an estimated duration for activity 208.

Scenario 200 further depicts smartphone 202 receiving input 243 from user 201. In an embodiment, input 243 may likewise be a voice command received by smartphone 202 from user 201. In exemplary scenario 200, input 243 comprises, triggers, and/or is associated with stop cue 244. Upon smartphone 202 receiving input 243 comprising, triggering, or associated with a stop cue 244, stop timer 246 is recorded as a duration. An embodiment may update an average activity duration. An embodiment may record a timestamp for stop cue 244 and stop timer 246 may be a calculated real-time duration from a timestamp for begin cue 204. In an embodiment, stop cue 244 may identify activity 108, e.g., "Stop 'Breakfast' activity . . . " and stop cue 104 and activity 108 may be recorded. An embodiment may update a new activity duration by calculating a new average activity duration for activity 208.

In scenario 200, video 228 has a runtime of 11:22, as depicted by progress time 234, but stop timer 246 indicates a duration of 15:42. Scenario 200 indicates an embodiment that may learn, update, or be trained for a new activity duration—an activity duration longer than the provided content during the training scenario. An embodiment that is training or learning, such as depicted in at least part of scenario 200, may have to fill time after video 228 finishes and completion of activity 208 is not signaled by input 243 and end cue 244. Such time could be filled with additional content, repeated content, random content, or no content.

Exemplary scenario 250 of FIG. 2 depicts an embodiment that has learned a duration of an activity 208, e.g., in scenario 200, and provides content for the duration of activity 208. Scenario 250 depicts an embodiment in which nine videos are provided after learning or updating an average activity duration, such as in scenario 200.

Scenario 250 depicts smartphone 202 receiving input 253 from user 201. In an embodiment, input 253 may be a voice command received by smartphone 202 from user 201. In an embodiment, input 253 may be the same or similar to input 203. Upon smartphone 202 receiving input 253 comprising, triggering, or associated with a begin cue 254, a begin timer 256 initiates.

Scenario 250 also features an exemplary user interface 260. User interface 260 may feature content, e.g., video 268, displayed during activity 208. In scenario 250, where the system has been trained or has learned an activity duration, video 268 may be chosen in many different ways. In scenario 250, there are nine videos selected to be provided during activity 208.

On user interface 260 appears banner 264, which indicates that an activity is "in progress" and the displayed video is "3 of 9." Counter 266 is depicted showing a time 4:23 and progress time 274 indicates that the progress is 4:23 out of a runtime of 13:25. Remaining time 276 indicates that 9:02 remains in the total runtime. Similarly, on user interface 280 appears banner 284, which indicates that an activity is "in progress" and the displayed video is "6 of 9." Counter 286 is depicted showing a time 7:41 and progress time 290 indicates that the progress is 7:41 out of a runtime of 13:25. Remaining time 296 indicates that 5:44 remains in the total runtime. On user interface 281 appears banner 285, which indicates that an activity is "complete" and the displayed video is "9 of 9." Counter 287 is depicted showing a time 13:25 and progress time 291 indicates that the progress is 13:25 out of a runtime of 13:25. Remaining time 297 indicates that 0:00 remains in the total runtime.

The position of markers 272, 292, and 293 on video progress bar 273 also indicates a corresponding progress time and a remaining time. An embodiment may use microphone icon 270 to indicate a potential for input such as a voice command. Activity identifier 278 may provide feedback that the system has identified activity 208 correctly and/or an average duration for activity 208. An embodiment may use in scenario 250 an update of a new activity duration from scenario 200. For instance, in scenario 250, activity identifier 278 depicts "13 minutes (average)" as a learned average activity duration for "Breakfast" as compared to activity identifier 238, in scenario 200, which depicts "10 minutes (average)" as a prior average activity duration for "Breakfast." An embodiment may hide or move one or more features of user interface 260, 280, and/or 281.

An embodiment may select content such as video 268, video 288, and video 289 in many ways. A difference between scenario 250 and scenario 200 may be that scenario 250 provides content with a total runtime of 13:25 while scenario 200 provides video 228 with a runtime of 11:22. In an embodiment like scenario 200, video 228 may be a segment of a television program from VOD, DVR, or OTT, however, because stop timer 246 of scenario 200 indicates a duration of 15:42, activity 208 finished after completion of video 228.

In scenario 250, content, including video 268, video 288, and video 289, is selected as part of nine videos, as depicted in banners 264, 284, and 285. In an embodiment like scenario 250, content may be selected in part because the total runtime of all videos, as indicated by progress time 274 and progress time 290 and 291, is similar to a learned average activity duration of "13 minutes (average)" as depicted in activity identifier 278. In an embodiment, video 168 and video 188 may be selected instead of a television program with a runtime similar to video 128 because the runtime exceeds an average activity duration for activity 108 by a predetermined threshold. In an embodiment, content, including video 268, video 288, and video 289, may be selected based on substantive content in each video and then adjusted to fit an appropriate total runtime by adding more content, e.g., short video clips. In an embodiment, video 268, video 288, and video 289 may be selected from a pool of potential content items, for instance, because of associated metadata matching a profile of user 201 as well as fitting in a playlist with a total runtime similar to a learned average activity duration.

Figure 3:
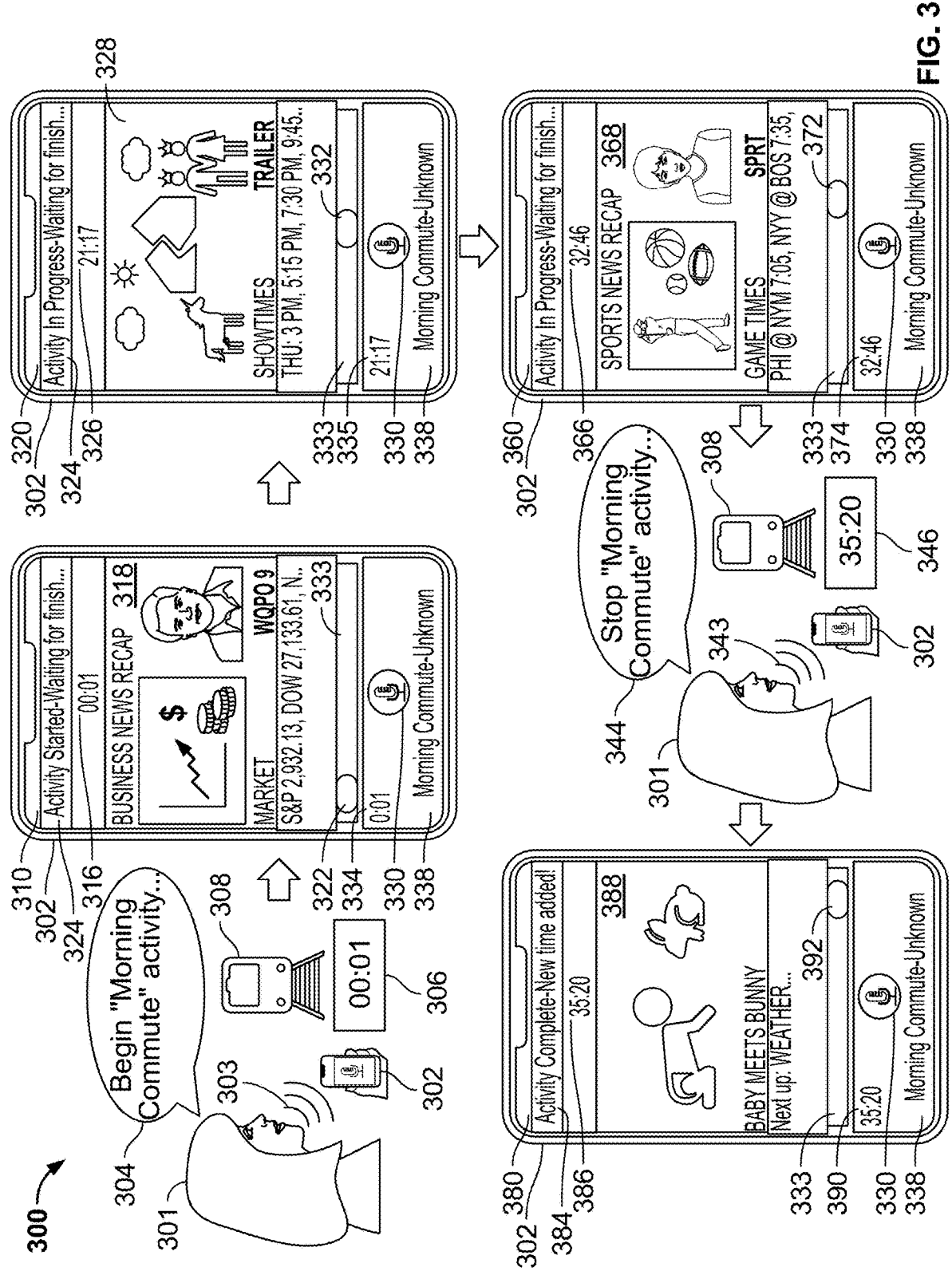
FIG. 3 depicts an illustrative scenario and user interface for learning a duration of a variable-duration activity and providing content during a variable-duration activity, in accordance with some embodiments of the disclosure.

FIG. 3 depicts an illustrative scenario and user interface for learning a duration of a variable-duration activity and providing content during a variable-duration activity, in accordance with some embodiments of the disclosure.

An exemplary embodiment is depicted in FIG. 3 as scenario 300 with smartphone 302. Smartphone 302 may be any other suitable device such as any device as depicted in FIGS. 7 and 8.

Exemplary scenario 300 of FIG. 3 depicts an embodiment that learns a duration of an activity 208 in order to subsequently provide content for the duration of activity 208, where there is a plurality of content items provided during initial training for an activity 308. Scenario 300 depicts smartphone 302 receiving input 303 from user 301. In an embodiment, input 303 may be any form of input, e.g., a voice command or a button press or a gesture, by user 301 and received by smartphone 302. In exemplary scenario 300, input 303 comprises, triggers, and/or is associated with begin cue 304. Upon smartphone 302 receiving input 303 and begin cue 304, a begin timer 306 initiates. An embodiment may record a timestamp for begin cue 304, and begin timer 306 may be a calculated real-time difference from the timestamp for begin cue 304. In an embodiment, begin cue 304 may identify activity 308, e.g., "Begin 'Morning Commute' activity . . . " and begin cue 304 and activity 308 may be recorded in an activity duration database.

Scenario 300 also features an exemplary display screen of smartphone 302 with a content delivery application depicted as user interface 310. User interface 310 may feature content, e.g., video 318, that may be displayed during activity 308. In scenario 300, where the system may be training or learning a duration, video 318 may be chosen in many different ways. An embodiment depicted in FIG. 3 may sequentially identify and provide a content item on an as needed basis until activity 308 is complete and an expected duration may be calculated. For instance, an embodiment may select video 318 based on matching interests, metadata, or a profile.

On user interface 310 appears banner 324, which indicates that an activity is "started." Counter 316 is depicted showing a time 0:01 and progress time 334 indicates that the progress is 0:01. The position of marker 322 on video progress bar 333 may indicate a relative progress time of the activity or a remaining time of a video, e.g., as the total activity duration is unknown. An embodiment may use microphone icon 330 to indicate a potential for input such as a voice command to pause, resume, and/or end the activity and content. Activity identifier 338 may provide feedback that the system has identified activity 308 correctly and/or identify an estimated duration for activity 308.

Scenario 300 further depicts video 328 in user interface 320 and video 368 in user interface 360 to demonstrate that a training scenario, such as scenario 300, may provide multiple content items during activity 308. Each of video 328 and video 368 are depicted with corresponding counter 326 and counter 366 indicating a relative progress time. Scenario 300 further depicts video 388 in user interface 380; video 388 may be stopped or paused after a stop cue and/or end of the activity 308.

Scenario 300 further depicts smartphone 302 receiving input 343 from user 301. In an embodiment, input 343 may likewise be a voice command or other input received by smartphone 302 from user 301. In exemplary scenario 300, input 343 comprises, triggers, and/or is associated with stop cue 344. Upon smartphone 302 receiving input 343 comprising, triggering, or associated with a stop cue 344, stop timer 346 is recorded as a duration. An embodiment may update an average activity duration. An embodiment may record a timestamp for stop cue 344 and stop timer 346 may be a calculated real-time duration from a timestamp for begin cue 304. In an embodiment, stop cue 244 may identify activity 108, e.g., "Stop 'Morning Commute activity . . . '" and stop cue 344 and activity 308 may be recorded. An embodiment may update a new activity duration by calculating a new average activity duration for activity 308. In subsequent performances of activity 308 a new average activity duration for activity 308 based on recorded stop timer 346 may be used as an average or estimated duration.

FIG. 4 depicts illustrative tables for activity data structures, in accordance with some embodiments of the disclosure. FIG. 4 depicts an illustrative table for an activity duration data structure, in accordance with some embodiments of the disclosure. An embodiment may store one or more activity duration data structures in an activity duration database.

An embodiment that may be used to track activity data incorporates an activity duration data structure as depicted in FIG. 4. An embodiment may record start and stop times for an activity within such a data structure. There are many data structures suitable for tracking and storing conversations such as an array, matrix, stack, linked list, tree, queue or string. Hierarchical data structures such as a tree may be beneficial for organization based on different types of activities. Data structures may be stored in several ways, including in one or more databases. Data structures can be stored both locally on the device and remotely in a network. An embodiment may utilize an activity engine and/or a content curation engine, stored and executed by one or more of the processors and memory depicted in FIGS. 7 and 8, to store and track activity data as well as curate and provide content during each activity.

An embodiment may include an activity engine storing start and end times and calculating activity durations and average activity durations, as well as storing times and durations in an activity duration data structure such as an activity duration data structure 400 depicted in FIG. 4. Activity duration data structure 400 may depict data recorded for a user performing an activity such as exercising on a treadmill. Activity duration data structure 400 includes fields such as entry field 401, begin cue field 402, end cue field 404, duration field 406, and updated average field 408. In an embodiment as depicted in activity duration data structure 400, each cell in duration field 406 includes a duration as calculated from a difference between end cue field 404 and begin cue field 402. For instance, a duration of 0:37:26 in cell 416 is calculated as a difference between 7:12:39 PM from cell 414 and 6:35:13 PM from cell 412, both occurring on Mar. 5, 2019. An embodiment may include cell 418, an updated average field 408 cell, as an arithmetic mean calculated from prior entry durations. Such an embodiment may be learning with each iteration of an activity and entry in activity duration data structure 400.

In activity duration data structure 400, for example, entry 1 in row 410 includes a duration field 406 of 0:37:26 in cell 416 and an updated average field 408 of 0:37:26 in cell 418. Entry 2 in row 420 includes a duration field 416 of 0:39:48 in cell 426 and an updated average field 408 of 0:38:37 in cell 428 based on, e.g., the arithmetic mean of 0:37:26 and 0:39:48. Entry 3 and entry 4 are calculated as, e.g., an arithmetic mean of prior entries, to yield 0:37:49 in cell 438 and 0:38:08 in cell 448.

In an embodiment one or more content items may be provided for the expected duration of an activity, e.g., data in a cell from updated average field 408 from a most recent entry. For instance an embodiment using an updated average field 408 of 0:37:26 in cell 418 may select and provide one or more content items with a total runtime similar to 37 minutes and 26 seconds. An embodiment may use one or more content items with a runtime that is similar but different from an expected activity duration, e.g., when the content substance is known to be of interest to a user. Depending on the actual one or more content items provided and their corresponding runtimes, a subsequent entry may have a duration field 406 either shorter or longer than the updated average field 408 of the prior entry. For instance, a duration field 406 of 0:39:48 in cell 426 is longer than an expected duration based on updated average field 408 of 0:37:26 in cell 418 which could indicate, e.g., variability in activity duration or that a provided content item ran longer than expected.

An embodiment may provide a video on business news despite a user's preference for sports news because the runtime may fit a portion of an activity better, but a user who dislikes business news may prefer a video clip of sports news even if the segment runtime may not fit the duration or may run longer. An embodiment that may provide a sports clip even though its inclusion may increase a runtime beyond an expected duration may yield data similar to entry 2 in row 420 and may trigger an adjustment to increase updated average 408, such as in cell 428. Likewise, an embodiment that may provide preferred weather content even though its inclusion may decrease a runtime from an expected duration may yield data similar to entry 3 in row 430, which may trigger an adjustment to lower an updated average 408, such as in cell 438.

Figure 5:
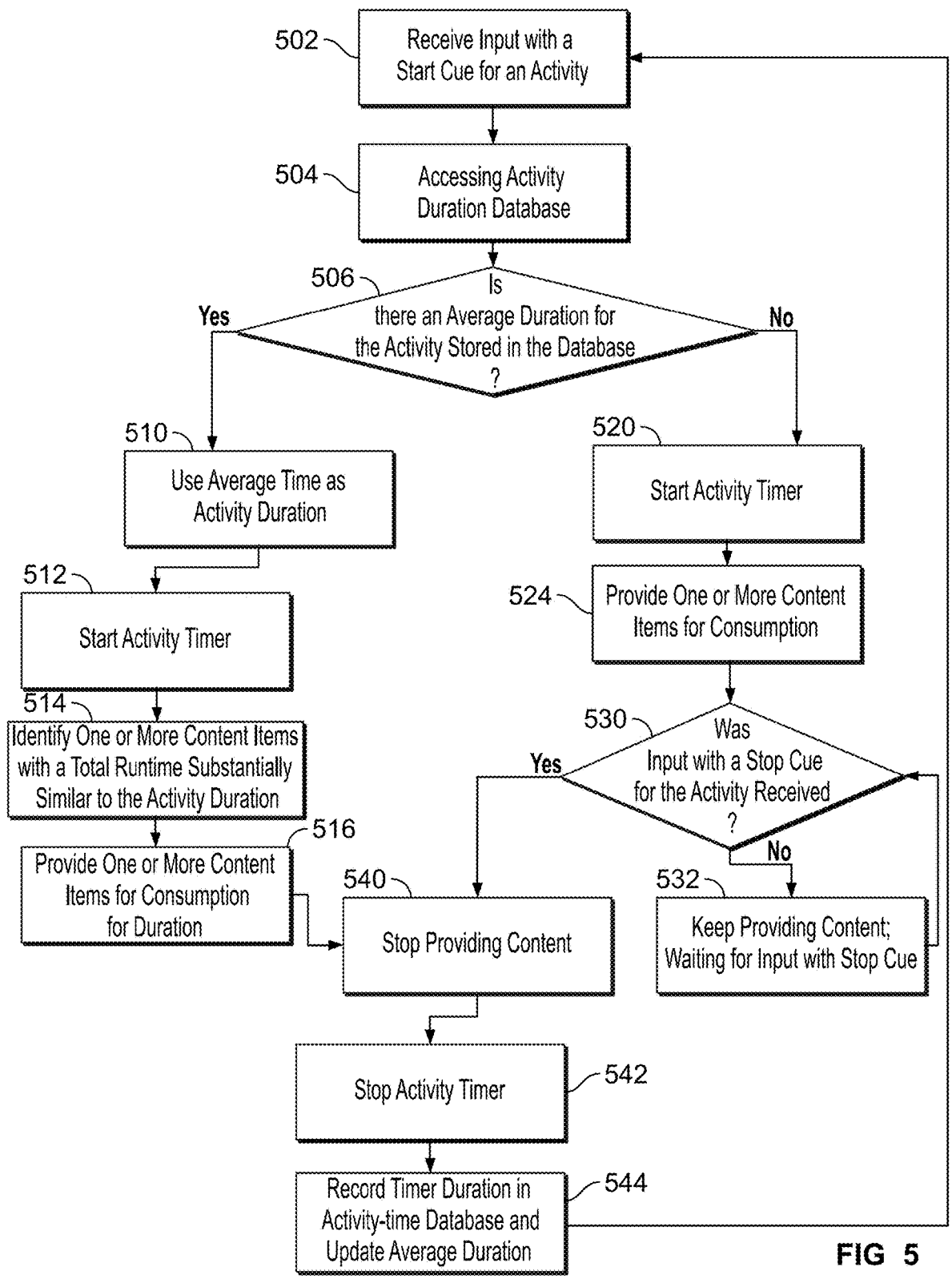
FIG. 5 depicts an illustrative flowchart of a process for learning a duration of a variable-duration activity and providing content during a variable-duration activity, in accordance with some embodiments of the disclosure.

FIG. 5 depicts an illustrative flowchart of a process for learning a duration of a variable-duration activity and providing content during a variable-duration activity in accordance with one or more embodiments. An embodiment may include, for instance, an activity engine and a content curation engine carrying out the steps depicted in the flowchart of FIG. 5.

In step 502, an activity engine receives input with the start cue for an activity. In step 504, the activity engine accesses an activity duration database. In step 506, the activity engine determines if there is an average duration for the activity stored in the activity duration database. If there is not an average duration for the activity previously stored, then in step 520, an activity timer is started and, in step 524, the content curation engine provides one or more content items for consumption during the activity. The content curation engine provides content for consumption until a stop cue for the activity is received, in step 530 the activity engine determines if a stop cue is received. In step 532, if there is not a stop cue received by the activity engine, the content curation engine keeps providing content and waiting for input with a stop cue. If a stop cue is received by the activity engine, then the content curation engine, in step 540, stops providing content.

If there is an average duration stored for the activity, as determined in step 506, then, in step 510, the activity engine uses the average time as the activity duration. In step 512, an activity timer is started. In step 514, the content curation engine identifies one or more content items with a total runtime substantially similar to the activity duration. In step 516, the content curation engine provides one or more content items for consumption during the activity until it stops providing content in step 540.

When the content curation engine stops providing content in step 540, either after step 516 or step 530, the activity engine, in step 542, stops the activity timer. In step 544, the activity engine records the end time and duration in the activity duration database and updates the average duration and then waits to receive input with a start cue for the subsequent instance of the activity, in step 502.

Figure 6:
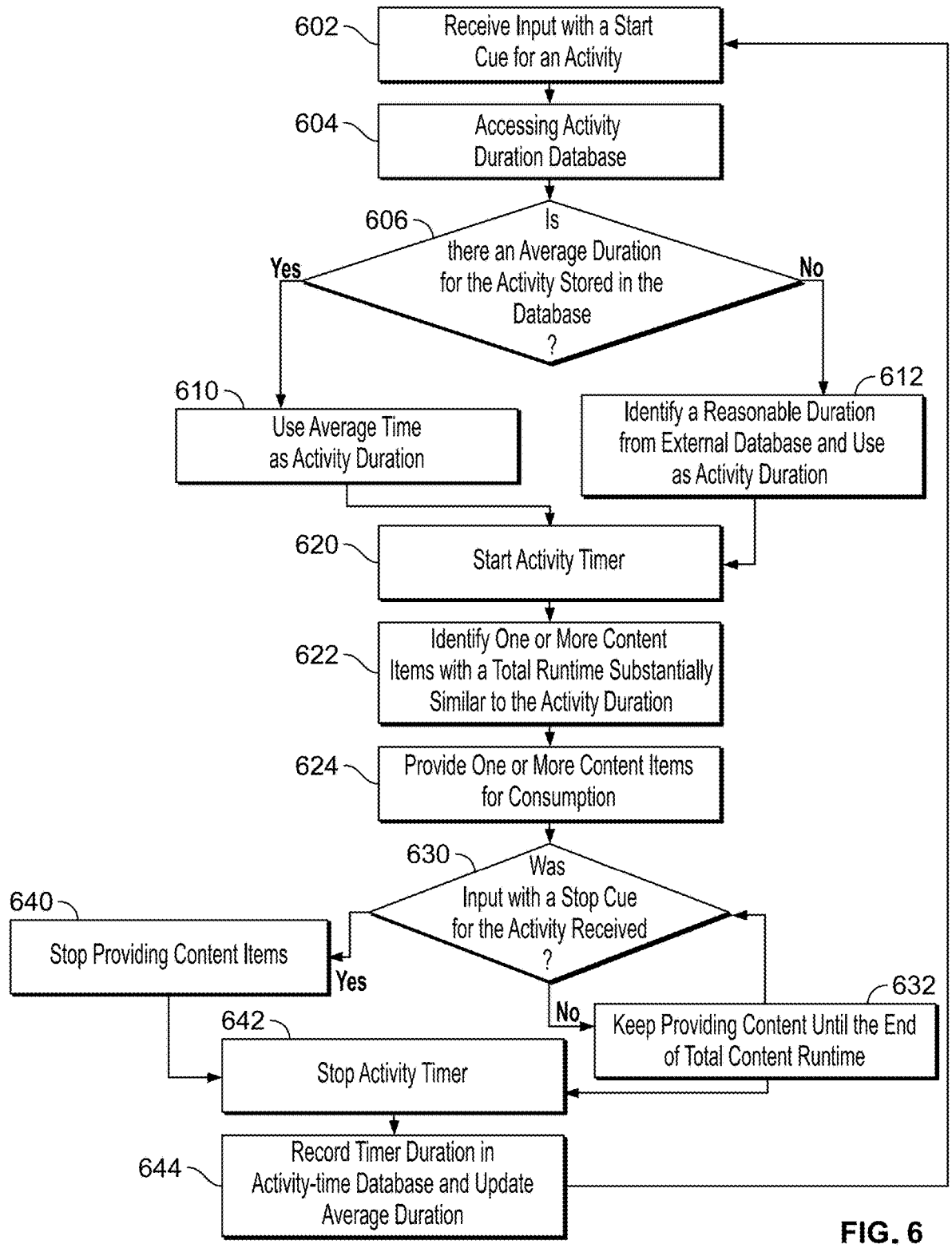
FIG. 6 depicts an illustrative flowchart of a process for learning a duration of a variable-duration activity and providing content during a variable-duration activity, in accordance with some embodiments of the disclosure.

FIG. 6 depicts an illustrative flowchart of a process for learning a duration of a variable-duration activity and providing content during a variable-duration activity in accordance with one or more embodiments. An embodiment may include, for instance, an activity engine and/or a content curation engine carrying out the steps depicted in the flowchart of FIG. 6.

In step 602, an activity engine receives input with the start cue for an activity. In step 604, the activity engine accesses an activity duration database. In step 606, the activity engine determines if there is an average duration for the activity stored in the activity duration database. If there is an average duration for the activity previously stored, then, in step 610, the activity engine uses the stored average time as an activity duration. If there is not an average duration for the activity previously stored, then in step 612, the activity engine identifies a reasonable duration, e.g., from an external database or a default time, and uses the identified reasonable duration as the activity duration.

Then in step 620, an activity timer is started and, in step 622, the content curation engine identifies one or more content items with a total runtime substantially similar to the activity duration determined from step 610 or step 612. In step 624, the content curation engine provides one or more content items for consumption during the activity. The content curation engine provides one or more content items for consumption until the end of the total runtime of the one or more content items or a stop cue is received by the activity engine. For instance, in step 630 the activity engine determines if input with a stop cue is received. If a stop cue is not received, then, in step 632, the activity engine keeps waiting to receive input with a stop cue and the content curation engine keeps providing content until the end of the total runtime. If a stop cue is received by the activity engine then, in step 640, the content curation engine stops providing the content items. Once the content items are not provided in step 640 or the total runtime of the content items is reached, the activity engine stops the activity timer in step 642. Then, in step 644, the activity engine records the end time and duration in the activity duration database and updates the average duration and then waits to receive input with a start cue for the subsequent instance of the activity, in step 602.

FIG. 7 shows a generalized embodiment of illustrative device 700. As referred to herein, device 700 should be understood to mean any device that can receive input and provide content for consumption. As depicted in FIG. 7, device 700 is a smartphone. However, device 700 is not limited to smartphones and may be any computing device. For example, device 700 of FIG. 7 can be implemented in system 800 of FIG. 8 as device 802 (e.g., a smartphone, a smart television, a tablet, a microphone (e.g., with a virtual assistant), a computer, or any combination thereof).

Media device 700 may receive data via input/output (hereinafter I/O) path 702. I/O path 702 may provide received data to control circuitry 704, which includes processing circuitry 706 and storage 708. Control circuitry 704 may be used to send and receive commands, requests, and other suitable data using I/O path 702. I/O path 702 may connect control circuitry 704 (and specifically processing circuitry 706) to one or more communication paths (described below). I/O functions may be provided by one or more of these communication paths, but are shown as a single path in FIG. 7 to avoid overcomplicating the drawing.

Control circuitry 704 may be based on any suitable processing circuitry such as processing circuitry 706. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 704 executes instructions for an activity engine and/or a content curation engine stored in memory (i.e., storage 708).

An activity engine may be a stand-alone application implemented on a device or a server. A content curation engine may be a stand-alone application implemented on a device or a server. An activity engine and/or a content curation engine may be implemented as software or a set of executable instructions. The instructions for performing any of the embodiments discussed herein of the activity engine and/or a content curation engine may be encoded on non-transitory computer-readable media (e.g., a hard drive, random-access memory on a DRAM integrated circuit, read-only memory on a BLU-RAY disk, etc.) or transitory computer-readable media (e.g., propagating signals carrying data and/or instructions). For example, in FIG. 7, the instructions may be stored in storage 708, and executed by control circuitry 704 of a device 700.

In some embodiments, an activity engine may be a client-server application where only the client application resides on device 700 (e.g., device 802), and a server application resides on an external server (e.g., server 806). For example, an activity engine and/or a content curation engine may be implemented partially as a client application on control circuitry 704 of device 700 and partially on server 806 as a server application running on control circuitry. Server 806 may be a part of a local area network with device 802, or may be part of a cloud computing environment accessed via the internet. In a cloud computing environment, various types of computing services for performing searches on the internet or informational databases, providing storage (e.g., for the keyword-topic database) or parsing data are provided by a collection of network-accessible computing and storage resources (e.g., server 806), referred to as "the cloud." Device 700 may be a cloud client that relies on the cloud computing capabilities from server 806 to determine times, identify one or more content items, and provide content items by the activity engine and/or content curation engine. When executed by control circuitry of server 806, the activity engine may instruct the control circuitry to generate the activity engine output (e.g., the average duration) and transmit the generated output to device 802. When executed by control circuitry of server 806, the content curation engine may instruct the control circuitry to generate the content curation engine output (e.g., content items) and transmit the generated output to device 802. The client application may instruct control circuitry of the receiving device 802 to generate the activity engine and/or content curation engine output. Alternatively, device 802 may perform all computations locally via control circuitry 704 without relying on server 806.

Control circuitry 704 may include communications circuitry suitable for communicating with an activity engine server, a content curation engine server, or other networks or servers. The instructions for carrying out the above-mentioned functionality may be stored and executed on server 806. Communications circuitry may include a cable modem, an integrated services digital network (ISDN) modem, a digital subscriber line (DSL) modem, a telephone modem, an Ethernet card, or a wireless modem for communications with other equipment, or any other suitable communications circuitry. Such communications may involve the internet or any other suitable communication network or paths. In addition, communications circuitry may include circuitry that enables peer-to-peer communication of devices, or communication of devices in locations remote from each other.

Memory may be an electronic storage device provided as storage 708 that is part of control circuitry 704. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, gaming consoles, or any other suitable fixed or removable storage devices, and/or any combination of the same. Non-volatile memory may also be used (e.g., to launch a boot-up routine and other instructions). Cloud-based storage (e.g., on server 806) may be used to supplement storage 708 or instead of storage 708.

A user may send instructions to control circuitry 704 using user input interface 710 of device 700. User input interface 710 may be any suitable user interface touchscreen, touchpad, stylus and may be responsive to external device add-ons such as a remote control, mouse, trackball, keypad, keyboard, joystick, voice recognition interface, or other user input interfaces. Display 710 may be a touchscreen or touch-sensitive display. In such circumstances, user input interface 710 may be integrated with or combined with display 712. Display 712 may be one or more of a monitor, a television, a liquid crystal display (LCD) for a mobile device, amorphous silicon display, low temperature poly silicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 712. Speakers 714 may be provided as integrated with other elements of user equipment device 700 or may be stand-alone units. An audio component of content displayed on display 712 may be played through speakers 714. In some embodiments, the audio may be distributed to a receiver (not shown), which processes and outputs the audio via speakers 714.

Control circuitry 704 may allow a user to provide user profile information or may automatically compile user profile information. For example, control circuitry 704 may monitor the words the user inputs in his/her messages for keywords and topics. In some embodiments, control circuitry 704 monitors user inputs such as texts, calls, conversation audio, social media posts, etc., to detect keywords and topics. Control circuitry 704 may store the detected input terms in a keyword-topic database and the keyword-topic database may be linked to the user profile. Additionally, control circuitry 704 may obtain all or part of other user profiles that are related to a particular user (e.g., via social media networks), and/or obtain information about the user from other sources that control circuitry 704 may access. As a result, a user can be provided with a unified experience across the user's different devices.

As depicted in FIG. 8, device 802 may be coupled to communication network 804. Communication network 804 may be one or more networks including the internet, a mobile phone network, mobile voice or data network (e.g., a 4G or LTE network), cable network, public switched telephone network, Bluetooth, or other types of communication network or combinations of communication networks. Thus, device 802 may communicate with server 806 over communication network 804 via communications circuitry described above. In should be noted that there may be more than one server 806, but only one is shown in FIG. 8 to avoid overcomplicating the drawing. The arrows connecting the respective device(s) and server(s) represent communication paths, which may include a satellite path, a fiber-optic path, a cable path, a path that supports internet communications (e.g., IPTV), free-space connections (e.g., for broadcast or other wireless signals), or any other suitable wired or wireless communications path or combination of such paths.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method of providing content for a duration of a variable-duration activity, the method comprising:
   recording a first start cue indicating a start of a first session of a variable-duration activity;
   recording a first stop cue indicating an end of the first session of the variable-duration activity;
   determining an average time for the variable-duration activity based on time differences between the corresponding first start cue and first stop cue;
   receiving an input and identifying a second start cue;
   identifying a plurality of content items to provide during a second session of the variable-duration activity, the total runtime of the plurality of content items being substantially the same as the average time for the variable-duration activity; and
   providing for consumption the plurality of content items during the second session of the variable-duration activity.

2. The method of claim 1, wherein the start cue is received as explicit input.

3. The method of claim 1, wherein the start cue is received as implicit input.

4. The method of claim 1, wherein at least one of the one or more content items has a variable runtime.

5. The method of claim 1, wherein the one or more content items comprises a plurality of videos in a playlist.

6. The method of claim 1, wherein the one or more content items comprises at least one of the following: video, music, a podcast, and one or more portions of an audiobook.

7. The method of claim 1, wherein the recording the first start cue further comprises receiving the first start cue from one of the following: a smartphone, a tablet, a smartwatch, an activity tracker, a smart speaker, a connected microphone, a television, a camera, and a display.

8. The method of claim 1, wherein the second start cue is recorded.

9. The method of claim 1, wherein the providing for consumption further comprises providing for consumption of the one or more content items via at least one of the following: a television, a monitor, a display, speakers, and headphones.

10. The method of claim 1 further comprising recording a second stop cue and updating the average time for the variable-duration activity based on a second time difference between the second start cue and the second stop cue.

11. A system for providing content for a duration of a variable-duration activity, the system comprising:
   memory configured to:
      record a first start cue indicating a start of a first session of a variable-duration activity;
      record a first stop cue indicating an end of the first session of the variable-duration activity; and
      input/output circuitry configured to receive an input and identifying a second start cue; and
   processing circuitry configured to:
      determine an average time for the variable-duration activity based on time differences between the corresponding first start cue and first stop cue;
      identify a plurality of content items to provide during a second session of the variable-duration activity, the total runtime of the plurality of content items being substantially the same as the average time for the variable-duration activity; and
      cause to be provided for consumption the plurality of content items during the second session of the variable-duration activity.

12. The system of claim 11, wherein the input/output circuitry is further configured to receive the start cue as explicit input.

13. The system of claim 11, wherein the input/output circuitry is further configured to receive the start cue as implicit input.

14. The system of claim 11, wherein at least one of the one or more content items has a variable runtime.

15. The system of claim 11, wherein the one or more content items comprises a plurality of videos in a playlist.

16. The system of claim 11, wherein the one or more content items comprises at least one from the following: video, music, a podcast, and one or more portions of an audiobook.

17. The system of claim 11, wherein the input/output circuitry is further configured to receive the start cue from one of the following: a smartphone, a tablet, a smartwatch, an activity tracker, a smart speaker, a connected microphone, a television, a camera, and a display.

18. The system of claim 11, wherein the memory is further configured to record the second start cue.

19. The system of claim 11, wherein the processing circuitry is further configured to cause to be provided for consumption via at least one of the following: a television, a monitor, a display, speakers, and headphones.

20. The system of claim 11, wherein the memory is further configured to record a second stop cue and wherein the processing circuitry is further configured to update the average time for the variable-duration activity based on a second time difference between the second start cue and the second stop cue.

* * * * *